(12) United States Patent
Farlow et al.

(10) Patent No.: US 7,072,693 B2
(45) Date of Patent: Jul. 4, 2006

(54) WIRELESS COMMUNICATIONS STRUCTURES AND METHODS UTILIZING FREQUENCY DOMAIN SPATIAL PROCESSING

(75) Inventors: Charles S. Farlow, Waconia, MN (US); Kris Kelkar, Camarillo, CA (US)

(73) Assignee: CalAmp Corp., Oxnard, CA (US)

( * ) Notice: Subject to any disclaimer, the term of this patent is extended or adjusted under 35 U.S.C. 154(b) by 568 days.

(21) Appl. No.: 10/422,411

(22) Filed: Apr. 23, 2003

(65) Prior Publication Data

US 2005/0101264 A1 May 12, 2005

Related U.S. Application Data

(63) Continuation of application No. 60/401,455, filed on Aug. 5, 2002.

(51) Int. Cl.
*H04M 1/00* (2006.01)
(52) U.S. Cl. .............. 455/562.1; 455/69; 370/334; 375/299
(58) Field of Classification Search ............ 455/562.1, 455/69, 101, 103, 272, 276.1; 375/299, 347; 370/334, 310
See application file for complete search history.

(56) References Cited

U.S. PATENT DOCUMENTS 5,592,490 A * 1/1997 Barratt et al. ................ 370/310

6,408,022 B1 6/2002 Fertner
6,452,981 B1 9/2002 Raleigh ...................... 375/299
6,496,140 B1 12/2002 Alastalo ..................... 342/174

OTHER PUBLICATIONS

Lal C. Godara, "Applications of Antenna Arrays to Mobile Communications, Part I: Performance Improvement, Feasibility and System Considerations", Proceedings of the IEEE, vol. 85, No. 7, Jul. 1997.
Lal C. Godara, "Applications of Antenna Arrays to Mobile Communications, Part II: Beam-Forming and Direction-of-Arrival Considerations", Proceedings of the IEEE, vol. 85, No. 8, Aug. 1997.
Van Veen, B. D., et al., "Beamforming: A Versatile Approach to Spatial Filtering", IEEE ASSP Magazine, Apr. 1988, pp. 4-24.
Krim, Hamid, et al., "Two Decades of Array Signal Processing Research", IEEE Signal Processing Magazine, Jul. 1996, pp. 67-94.

(Continued)

*Primary Examiner*—Lee Nguyen
(74) *Attorney, Agent, or Firm*—Koppel, Patrick & Heybl

(57) ABSTRACT

Wireless communications structures and methods are provided that utilize frequency domain spatial processing. Structure is included that receives and transmits signals from an array of Mβ antennas wherein the antennas are connected to M switches in groups of β. Each switch is connected to a single spatial processing channel and β antennas and each spatial processing channel is assigned complex multiplicative factor(s), or weight(s), that enhance overall system performance in the presence of interference and propagation-related impairments such as multipath fading.

52 Claims, 9 Drawing Sheets

OTHER PUBLICATIONS

K. K. Wong, et al., "Adaptive Antennas at the Mobile and Base Stations in an OFDM/TDMA System", IEEE Transactions on Communications, vol. 49, No. 1 Jan. 2001, pp. 195-206.

Lal C. Godara, et al., "Limitations and Capabilities of Frequency Domain Broadband Constrained Beamforming Schemes", IEEE Transactions on Signal Processing, vol. 47, No. 9 Sep. 1999, pp. 2386-2395.

* cited by examiner

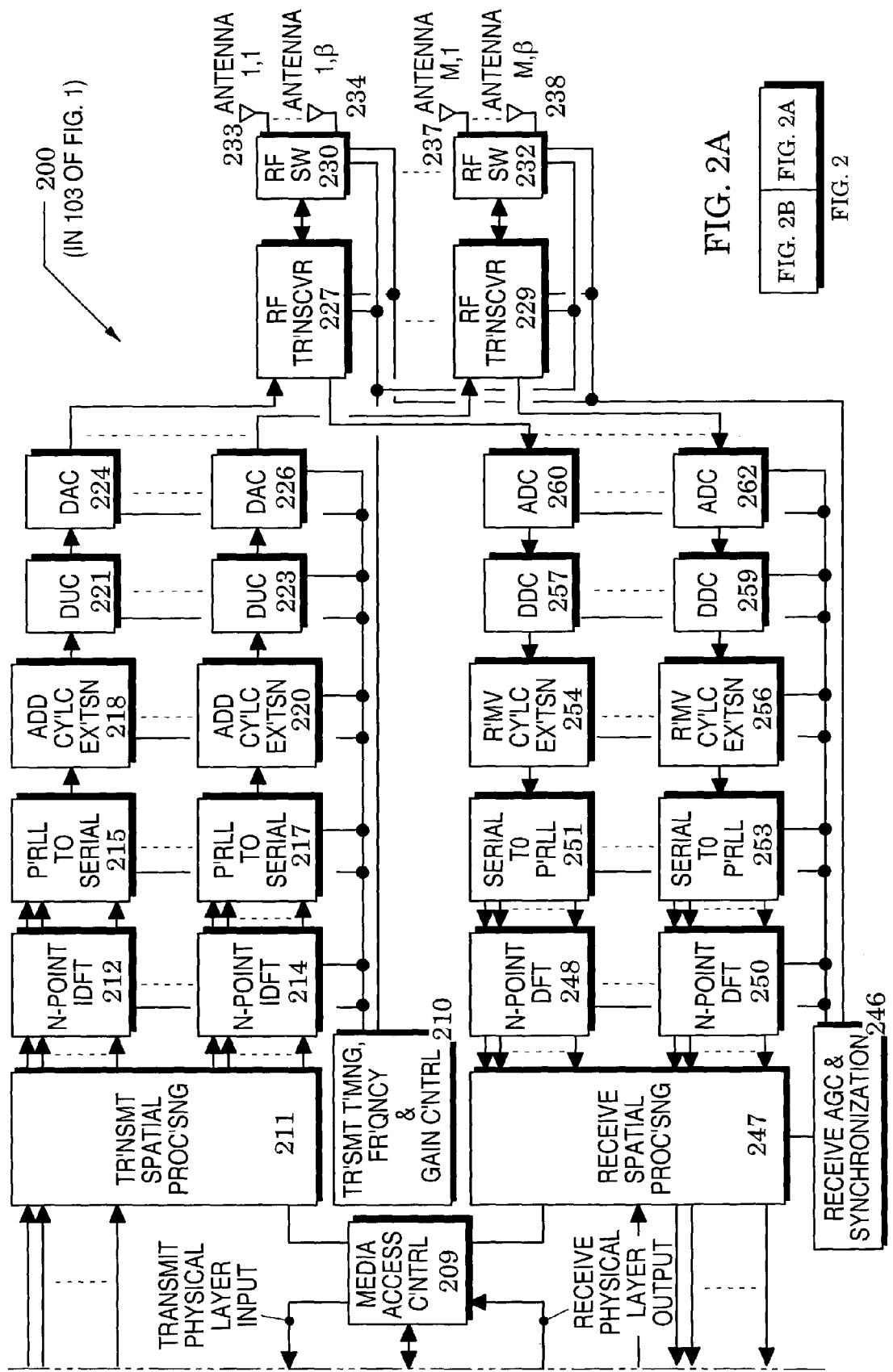

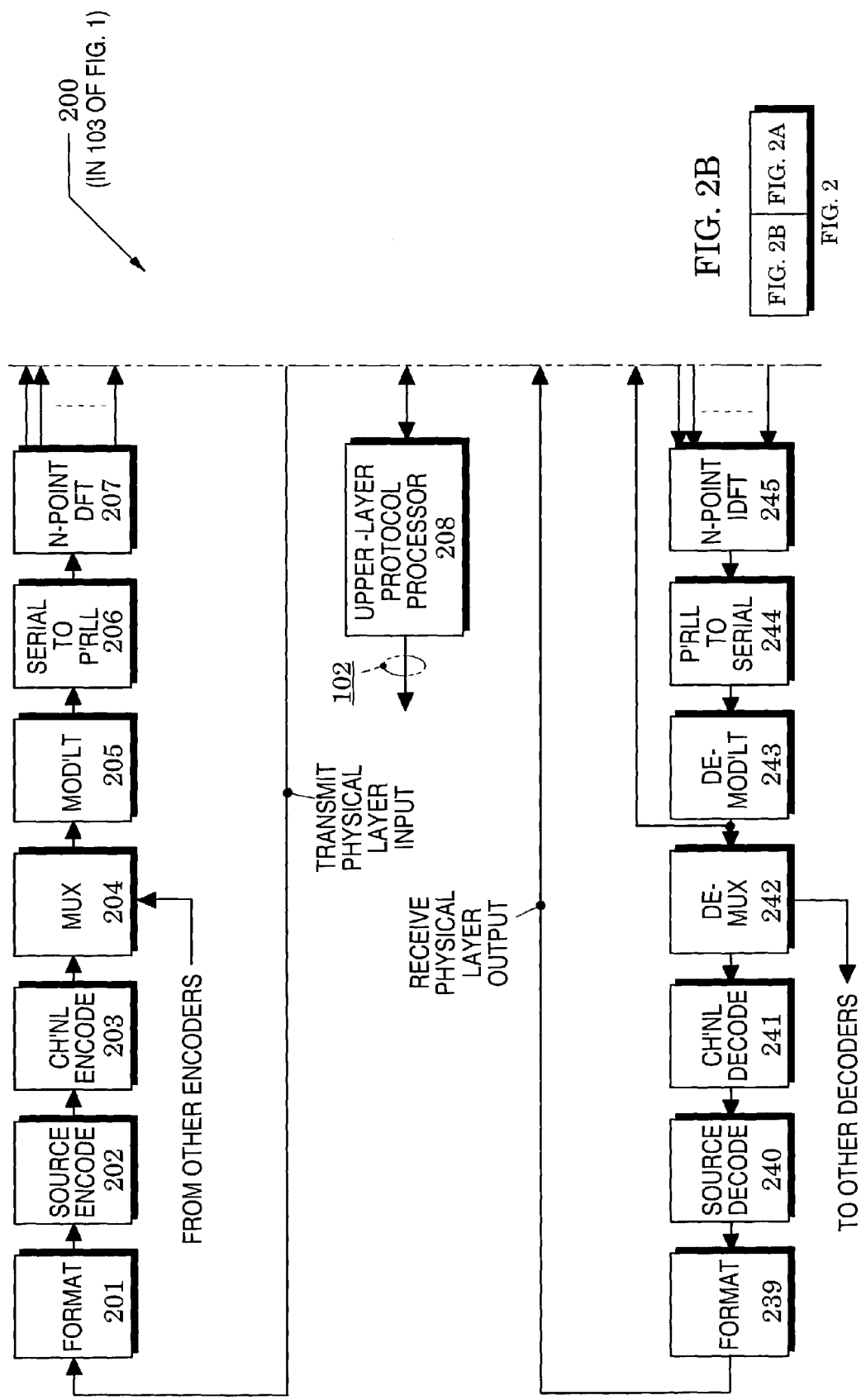

WIRELESS COMMUNICATIONS STRUCTURES AND METHODS UTILIZING FREQUENCY DOMAIN SPATIAL PROCESSING

CROSS REFERENCE TO RELATED APPLICATION

This application claims the benefit of U.S. Provisional Application Ser. No. 60/401,455 filed Aug. 5, 2002.

BACKGROUND OF THE INVENTION

1. Field of the Invention

The present invention relates generally to wireless communications systems.

2. Description of the Related Art

The performance of modern wireless communications equipment is typically limited by three factors: power & bandwidth, interference, and the wireless channel. The Federal Communications Commission has imposed power and bandwidth limitations on most communications bands, including the 2.4 GHz industrial, science and medicine (ISM) and the 5 GHz Unlicensed National Information Infrastructure (U-NII) bands. Fundamentally, these power and bandwidth limitations limit the range and data rate of any device deployed in a wireless network. Because of these limitations, devices that only employ conventional modem and signal processing technologies may not be able to support future multimedia and other high data rate applications such as streaming video.

In the unlicensed bands, interference is a serious problem since multiple emitters may share the same frequency in an uncontrolled manner. The interference caused by other emitters ultimately reduces the throughput possible from a system. Finally, the wireless channel limits overall performance due to large-scale propagation loss, multipath delay spread and temporal channel variation.

Published communication techniques include error correction coding, advanced modulation techniques, channel equalization, diversity, and beamforming. More recent approaches appear to be concentrated in the area of space-time coding. Error correction coding and modulation are the most common techniques used to mitigate the effects of path loss, interference and multipath fading. At some point, though, their use often introduces unacceptable overhead (due to added redundancy), latency, cost, and complexity. For example, the receiver phase noise required to implement $\geq$256-QAM (quadrature amplitude modulation) may require components whose costs are not acceptable for low-cost consumer devices. New turbo codes that exhibit enhanced performance require multiple decoding iterations, thus requiring higher speed, more costly circuitry to implement.

Channel equalization and spatial techniques such as switched diversity improve the performance of a device operating in a multipath fading environment, but do little to combat interference. Conventional beamforming algorithms based on direction-of-arrival (DOA) estimation are not feasible for systems with significant multipath, such as in most indoor applications. Space-time coding requires only a slight increase in receiver complexity for two antennas, but does not improve the performance of a system against interference. For more than two antennas, the implementation cost of space-time coding may prevent its adoption in systems that require low-cost consumer devices. Additionally, space-time coding requires changes in both the transmitter and the receiver.

BRIEF SUMMARY OF THE INVENTION

The present invention is directed to wireless communications structures and methods that utilize frequency domain spatial processing. It includes structure that receives and transmits signals from an array of M$\beta$ antennas wherein the antennas are connected to M switches in groups of $\beta$. Each switch is connected to a single spatial processing channel and $\beta$ antennas and each spatial processing channel is assigned complex multiplicative factor(s), or weight(s), that enhance overall system performance in the presence of interference and propagation-related impairments such as multipath fading.

The novel features of the invention are set forth with particularity in the appended claims. The invention will be best understood from the following description when read in conjunction with the accompanying drawings.

BRIEF DESCRIPTION OF THE DRAWINGS

FIG. 2 is a diagram of a base station embodiment in the system of FIG. 1 (wherein FIG. 2 comprises FIGS. 2A and 2B);

DETAILED DESCRIPTION OF THE INVENTION

Figure 1:
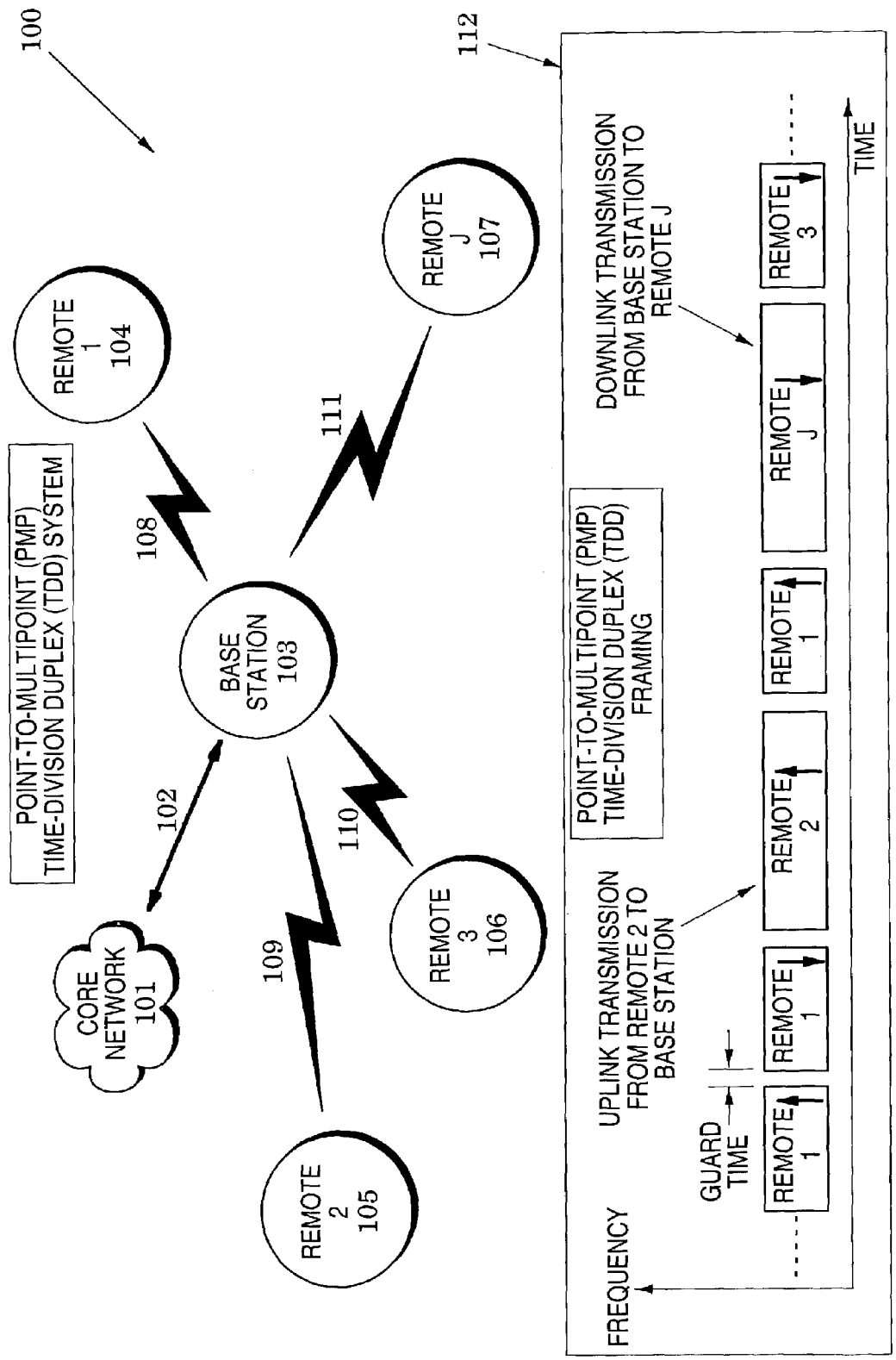
FIG. 1 illustrates a point-to-multipoint (PMP) time-division duplex (TDD) system embodiment of the present invention.

FIGS. 1–8 illustrate embodiments of the present invention which include a wireless communications device that receives and transmits signals from an array of M$\beta$ antennas. The antennas are connected to M switches in groups of $\beta$ wherein each switch is connected to a single spatial processing channel and $\beta$ antennas. Each spatial processing channel is assigned complex multiplicative factor(s), or weight(s), that enhance overall system performance in the presence of interference and propagation-related impairments such as multipath fading.

The presence of $\beta$ antennas improves the performance of the system by adding an extra degree of diversity to each spatial channel. The invention imposes no limitations as to how each group of $\beta$ antennas is configured relative to other groups of $\beta$ antennas (M groups total). For example, the groups (of $\beta$ antennas each) may be spaced at uniform or non-uniform intervals to achieve spatial diversity. Furthermore, the individual antennas within a group may be differentiated by space, polarization, beam pattern, or orientation to achieve spatial, polarization, or angular decorrelation. The invention imposes no limitations on the fabrication and/or electrical pattern of each individual antenna.

The embodiments described herein are applicable to all time-division duplex (TDD) systems, and are particularly suited to those that incorporate orthogonal frequency division multiplexing (OFDM). Assuming a relatively static propagation environment, TDD systems exhibit channel reciprocity since both uplink and downlink transmissions take place on the same frequency.

The algorithms described in this invention calculate and apply spatial weights to a signal received from a particular transmission source (hereinafter called uplink transmissions) and then, if a set of rules testing channel reciprocity permit, apply the complex conjugate of the same weights on one or more downlink transmissions to the same transmission source, which is now expecting to receive downlink signals.

For downlink transmissions, each spatial processing channel is also multiplied by complex calibration coefficients that compensate for the relative amplitude and phase errors between spatial channels due to receiver and transmitter implementation imperfections. The invention includes database algorithms that parse the spatial weights produced from multiple uplink sources operating from different locations within the bounds of a TDD framework.

Each antenna element receives one or more delayed version(s) of the signal in addition to interference. The correlation of signals between antenna elements is a function of antenna geometry and multipath scattering in the vicinity of receiving antennas. Assuming $\beta=1$ (one antenna per spatial channel), an M-element adaptive antenna array can produce 10log10(M) antenna gain in addition to providing rejection of interfering signals and diversity gain. Adaptive arrays can theoretically cancel N interferers with M elements (M>N) and provide 10log10(M−N) diversity gain if there is sufficiently low correlation between antenna elements. There is additional improvement in performance produced when $\beta>1$.

The previous result (M−1 interference rejection capability) assumes that each of the interfering signals exhibit delay spread that can be accommodated by a cyclic extension. Delayed signals that fall outside of the cyclic extension must be considered as separate signals within the degrees of freedom (M−1) that an array provides. The invention applies spatial weights in the frequency domain so as to reduce the bandwidth of signals that are processed by an adaptive algorithm, thereby preserving degrees of freedom for interference rejection and diversity.

The invention describes unique frequency domain algorithms that exhibit fast convergence and low processing overhead and provides a specific embodiment of the invention for an IEEE Std 802.11a-1999 compliant Access Point. The embodiment includes automatic gain control, synchronization, and diversity switch selection algorithms for this application.

In particular, FIG. 1 illustrates a point-to-multipoint (PMP) time-division duplex (TDD) system 100 consisting of a single base station 103 and a plurality of remote devices 104 through 107. A high-speed backhaul link 102 is used to carry information between the base station and a core network 101. The transmission media for backhaul link 102 is not specified as it may be fiber, coaxial cable, wireless, or some other future transmission media.

The invention is primarily embodied in base station 103 and the system in FIG. 1 that utilizes the base station 103. Information is exchanged between the base station 103 and remote devices 104 through 107 over wireless media 108 through 111. The invention imposes no restrictions on the number of remote devices, or their geographic orientation relative to the base station.

Diagram 112 illustrates the sharing of a single frequency between a plurality of remote devices using the TDD technique. Transmissions from the base station to remote device(s) are hereinafter referred to as downlink transmissions. Transmissions from a remote device to the base station are hereinafter referred to as uplink transmissions.

FIG. 2 shows a top-level block diagram 200 of the base station of FIG. 1 (for clarity of illustration, FIG. 2 comprises FIGS. 2A and 2B that interface at a partition line which is shown at the left side of FIG. 2A and the right side of FIG. 2B—the combination is hereinafter referred to as FIG. 2).

The interface to the core network (101 in FIG. 1) is shown on the left side of FIG. 2 and connected to the upper layer protocol processor 208. The upper layer protocol processor interfaces to the spatially aware media access control 209 (shown as media access c'ntrl and hereinafter abbreviated as SP-MAC). The individual antennas are located on the right side of FIG. 2 and numbered 233 through 238. The description focuses on the following blocks in transmit mode: 209, 210, 211, 227 through 229, 230 through 232, and 233 through 238. In the receive mode, the description focuses on blocks: 209, 246, 247, 227 through 229, 230 through 232, and 233 through 238.

Prior to operation, a calibration procedure is performed to measure the differential amplitude and phase of the receive and transmit hardware implementations for spatial channels 1 through M. A set of frequency domain complex correction values is calculated and stored for eventual application in transmit spatial processing 211 (shown as tr'nsmt spatial proc'sng).

During initialization, the radio frequency switches (RF SW) 230 through 232 (shown as rf sw) are initialized in a known state and the RF transceivers 227 through 229 (shown as rf tr'nscvr) are set to the receive mode. In receive mode, a wireless signal is simultaneously received over M$\beta$ antennas 233 through 238. The RF transceivers 227 through 229 amplify and convert the signals from a radio frequency (RF) to an intermediate frequency (IF) or baseband frequency. The analog to digital converters (ADC) 260 through 262 sample, quantize, and code the IF or baseband signals into digital format. Each RF SW 230 through 232 is controlled by 246 to select one of $\beta$ antennas based on received signal power, positive correlation of the received signal with a known reference, or another algorithm that maximizes diversity benefits.

To effectively process the signal using spatial algorithms, the receive automatic gain control (AGC) and synchronization function 246 sets the gain of transceivers 227 through 229 so that their outputs are kept within the dynamic range of ADCs 260 through 262, respectively. This functional block (246) also corrects for timing and frequency offsets. The lines connected to 246 represent a multiplicity of input and output signals used for timing, gain, and frequency control.

The digital downconverters (DDC) 257 through 259 mix the respective signals to baseband (0 Hz) and, optionally, digitally filter and reduce the sample rate of each spatial channel. The digital mix frequency is generated by 246.

Alternately, the interface from RF transceivers 227 through 229 may be at baseband (0 Hz), thereby increasing the number of ADCs by a factor of two and changing the functionality of DDCs 257 through 259 to only offset the receive frequency (around 0 Hz, as opposed to around a receive IF), if required. The choice of using IF or baseband sampling may be determined by cost, performance, and availability of implementation options.

The AGC algorithm 246 calculates a gain value for RF transceivers 227 through 229 based on ADC outputs 260 through 262, DDC outputs 257 through 259, and, optionally, received signal strength indications from RF transceivers 227 through 229. The cyclic extension is removed from the time domain signal by 254 through 256 (shown as r'mv cy'lc ex'tsn) under the control of 246. The signals are converted to parallel format by 251 through 253 (shown as serial to p'rll) and converted into the frequency domain by N-point discrete Fourier transforms (DFT) 248 through 250.

After the spatial channels have been transformed into the frequency domain, receive spatial processing 247 calculates and applies one or more complex spatial weights that have been calculated to minimum mean-squared error (MMSE) or another criteria. The weight vector(s) and a time-stamp are passed to the spatially aware media access control (SA-MAC) 209. SA-MAC 209 correlates and stores the spatial information, or some transform thereof, as spatial weights with the decoded source address of the device that transmitted the uplink signal.

The output of 247 is then optionally processed by an N-point inverse discrete Fourier transform (IDFT) 245 based on whether the demodulating process is applied to time domain or frequency domain signals. The resultant signal is then processed by the remaining blocks in the system 244, 243, 242, 241, 240, 239 (respectively shown as p'rll to serial, de-mod'lt, de-mux, ch'nl decode, source decode and format) that perform parallel to serial conversion, demodulate, demultiplex, channel decode, source decode, and format functions, respectively, before being output to 209.

The output of demodulate 243 is provided to receive spatial processing 247 for decision-aided adaptation (e.g. decision-feedback) of spatial weights if such mode is deemed appropriate. De-interleaving, if included, is encapsulated in the channel decode function 241. De-scrambling, if included, is encapsulated in the source decode function 240. The SA-MAC 209 parses the output of 239 and determines if the information should be passed to upper layers for further processing. The receive processing sequence is now complete.

In transmit mode, the information is received from upper network layers and parsed in the SA-MAC 209 before being passed to format block 201. The SA-MAC 209 examines the destination address of the transmit information and determines if a set of spatial weights are available from a prior reception within a pre-determined timeout period. If these, and potentially other tests, are true, then the SA-MAC 209 transfers the stored spatial weights to 211. Such other tests may include determination of whether the message is unicast, multicast or broadcast.

Otherwise, the SA-MAC 209 transfers a calculated set of weights to 211. Such calculation may be based on a mathematical combination of a plurality of weights stored (as with a multicast message) and reference weights, or an omni-directional weight (as with broadcast messages or messages where receive spatial information is either unavailable or unreliable).

After formatting, the signal is processed by 202 and 203 (shown as source encode and ch'nl encode). Scrambling, if included, is encapsulated in the source encode function 202. Interleaving, if included, is encapsulated in the channel encode function 203. The multiplex function 204 (shown as mux) accepts inputs from other encoding stages and also provides an insertion point for zero tones and training tones in OFDM applications. Multiplex 204 also serves as the insertion point for test signals that are activated during system calibration.

In OFDM systems, block 205 (shown as mod'lt) maps data bits to symbols for data-carrying subcarriers and sets the training tones to the appropriate amplitude and phase. For other modulation formats, the modulator uses appropriate modulating techniques. Block 206 (shown as serial to p'rll) converts the signal to parallel format for processing by DFT 207 where it is converted to the frequency domain (DFT 207 is bypassed for an OFDM application).

Transmit spatial processing 211 receives the frequency domain signal representation and applies complex calibration coefficients to each spatial channel. The calibration coefficients are applied in the frequency domain to compensate for frequency-selective amplitude and phase errors. Next, the spatial weights, or some transform thereof, passed to the block from SA-MAC 209 are applied to the corrected frequency domain representation of the transmit signal.

The order in which the transform is applied to the receive weights to generate a set of transmit weights and the storage/retrieval of these weights for use in transmission may be juxtaposed. Similarly, the order of application of calibration coefficients and spatial weights to the frequency domain representation of the transmit signal may be juxtaposed. Furthermore, the receive weights may be transformed to transmit weights and calibration coefficients may be applied prior to storage and retrieval and application to the frequency domain transmitted signal. The order of these processes is determined by SA-MAC 209 response time requirements, architecture, and implementation.

The transmit timing, frequency and gain control 210 generates timing signals that may be used to delay the output of IDFTs 212 through 214 if alignment with other sources is required. Orthogonal frequency division multiple access (OFDMA) or space division multiple access (SDMA) embodiments may require such alignment. This functional block (210) also generates frequency control signals to DUCs 221 through 223 that may be used to offset or otherwise control the transmit frequency in OFDMA, SDMA, or other applications. The lines connected to 210 represent a multiplicity of input and output signals used for timing, frequency, and gain control.

The output of transmit spatial processing 211 is processed by IDFTs 212 through 214 that convert the signal to the time domain. The time domain signal is converted to serial format by 215 through 217 (shown as p'rll to serial) under the control of 210. A cyclic extension is added in 218 through 220 (shown as add cy'lc ex'tsn) prior to mixing to a transmit IF by the digital upconverter (DUC) 221 through 223. The digital to analog conversions are performed by DACs 224 through 226.

The converted signal is passed to RF transceivers 227 through 229 along with the control signals generated by 210. Alternately, the interface to RF transceivers 227 through 229 may be at baseband (0 Hz), thereby increasing the number of DACs by a factor of two and changing the functionality of DUCs 221 through 223 to only offset the transmit frequency (around 0 Hz, as opposed to around a transmit IF) under the control of 210, if required. The choice of using IF or baseband sampling may be determined by cost, performance, and availability of implementation options.

The RF transceivers 227 through 229 are set to the transmit mode by signals originating from 210. These transceivers amplify and convert the signals from baseband or an intermediate frequency (IF) to a radio frequency (RF). The gain of these transceivers may be set based on implementation requirements related to linearity of the transceiver and modulation used, by regulatory requirements related to spectral emissions or maximum power output requirements, or for power control based on a closed loop power control using information sent by the receiver, channel reciprocity based on the strength of signals recently received from the intended destination, or other algorithms.

The radio frequency switches 230 through 232 are set to a state determined from a prior reception and passed from SA-MAC 209. The wireless signal is simultaneously transmitted over M selected antennas from the set of antennas 233 through 238. The transmit processing sequence is now complete. To reduce the processing resources required for implementation, all DFT functions (248 through 250, 207) may be replaced by Fast Fourier Transform (FFT) functions. Conversely, all IDFT functions (212 through 214, 245) may be replaced by Inverse Fast Fourier Transform (IFFT) functions.

Figure 3:
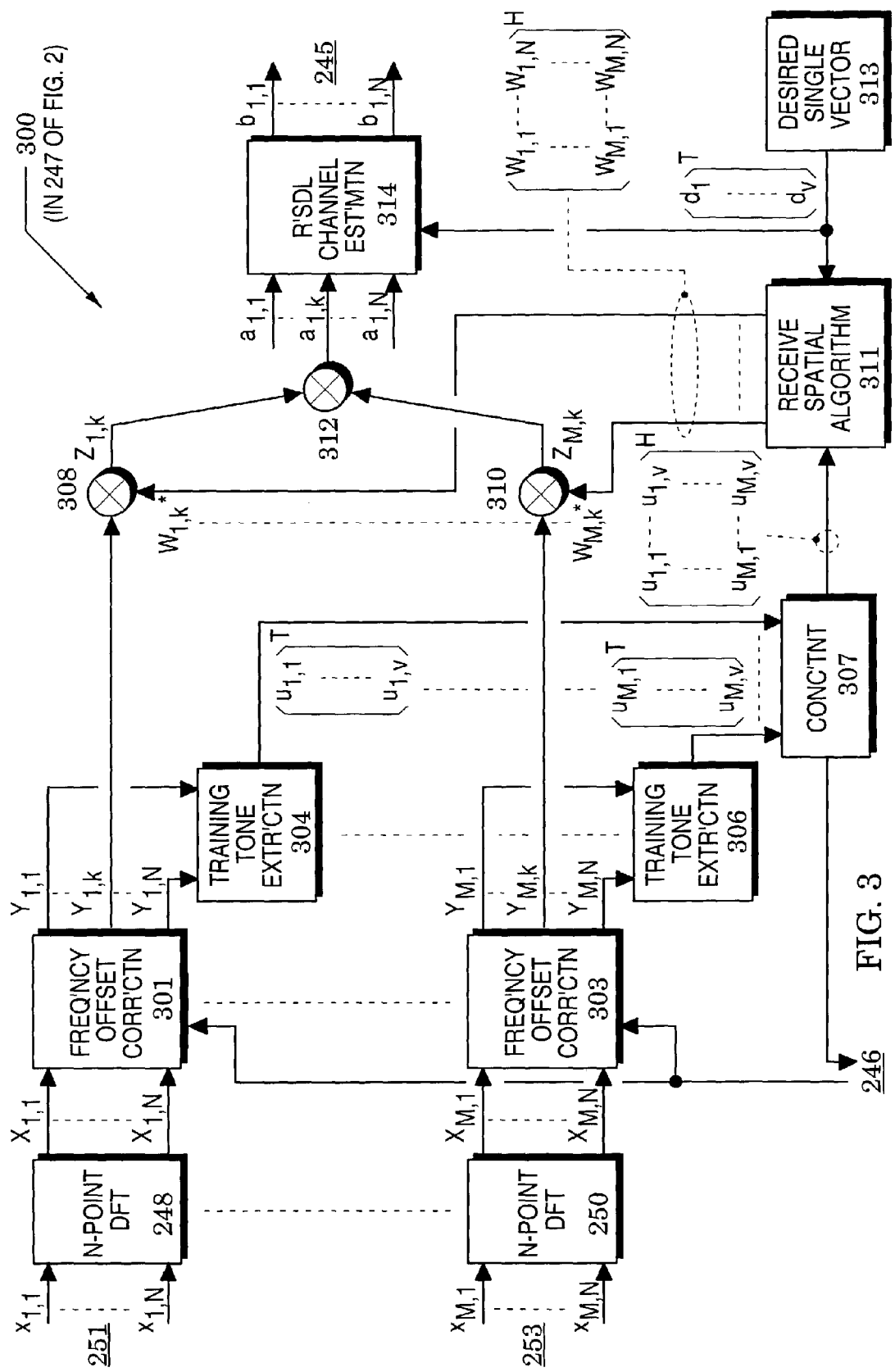
FIG. 3 is a diagram of receive spatial processing in the base station of FIG. 2.

Referring now to FIG. 3, receive spatial processing 247 of FIG. 2 is shown in greater detail 300. The time index for frequency domain signals, $nT_{DFT}$, is not shown for the sake of clarity. DFTs 248 through 250 are the same blocks previously shown in FIG. 2. The frequency domain signals from each receive spatial processing channel, 1 through M, are, optionally, compensated for frequency error by frequency offset correction 301 through 303 (shown as freq'ncy offset corr'ctn), under the control of receive AGC and synchronization (246 in FIG. 2). This function is optional since in some embodiments it is possible to correct for frequency error prior to the DFT.

The source of the frequency offset may be RF local oscillator differences, sampling frequency errors, or other implementation-related factors. Frequency correction 301 through 303 must be capable of correcting for a different frequency offset on each DFT output bin (1 through N) if the sampling frequency offset is not corrected prior to DFTs 248 through 250. This invention imposes no restriction on the algorithms or techniques used to calculate the frequency correction values for each output bin (1 through N) of DFTs 248 through 250.

FIG. 3 assumes that one or more training, or known reference, tones are received in the frequency domain. The total number of training tones will be denoted as "v", where $v \leq N$. Training tone extraction 304 through 306 extracts the training tones from the output of frequency offset correction 301 through 303. The input signal vector, of length M, for the $i^{th}$ training tone is defined as $$u_i(n) = \begin{bmatrix} u_{1,i}(n) \\ u_{2,i}(n) \\ \vdots \\ u_{M,i}(n) \end{bmatrix}$$

in which M is the number of antenna elements. Note that the notation specifies a discrete time vector sampled at $t=nT_{DFT}$. Concatenate 307 (shown as conc'tnt) produces an M×v signal matrix of v training tones as $$u(n) = \begin{bmatrix} u_{1,1}(n) & u_{1,2}(n) & \cdots & u_{1,v}(n) \\ u_{2,1}(n) & u_{2,2}(n) & \cdots & \vdots \\ \vdots & \vdots & \ddots & \vdots \\ u_{M,1}(n) & u_{M,2}(n) & \cdots & u_{M,v}(n) \end{bmatrix}$$

This matrix is also provided to receive AGC and synchronization 246. The desired signal, or reference, for the $i^{th}$ training tone is a scalar value $d_i(n)$. The desired signal vector 313 for v training tones is a 1×v vector defined as $$d(n)=[d_1(n)\ d_2(n)\ \ldots\ d_v(n)]$$

Receive spatial algorithm 311 calculates the weight matrix using single-tone adaptation, multi-tone adaptation, or extensions thereof to include methods for reducing processing overhead such as commutating single-tone adaptation on various tones over time. Single-tone adaptation calculates a separate M×1 weight vector for each training tone, while multi-tone adaptation produces a single M×1 weight vector for a group of training tones. The single-tone or multi-tone algorithms are adapted to MMSE or other criteria. Receive spatial algorithm 311 performs interpolation as necessary to construct the entire M×N weight matrix. In most cases, the dimension of the weight matrix will be less than M×N since many systems have some tones that are set to zero in order to reduce implementation complexity, thereby reducing the size of the matrix.

The Hermitian transpose of a unique M×1 weight vector is applied to the output of frequency offset correction 301 through 303 as indexed by "k". The multipliers 308 through 310 and adder 312 illustrate the weight vector multiplication for a single output indexed by k. A total of MN multipliers and N adders are required if the entire M×N weight matrix is to be applied.

The final function of receive spatial processing, residual channel estimation 314 (shown as r'sdl channel est'mtn), corrects for any remaining phase and amplitude errors in the received frequency domain signal. Such errors could be the result of a system with a sparse number of training tones (thereby introducing interpolation-related errors), or in multi-tone adaptation where a 'best-fit' spatial weight vector is calculated for a group of training tones. It is an optional function, and is not required for every embodiment. The output of 314, if implemented, is provided to 245 for further processing.

Six particular embodiments of the receive spatial algorithm 311 are single-tone least-mean square (ST-LMS), multi-tone least-mean square (MT-LMS), single-tone recursive least squares (ST-RLS), multi-tone recursive least squares (MT-RLS), single-tone sample matrix inversion (ST-SMI), and multi-tone sample matrix inversion (MT-SMI). The mathematical expressions for the single-tone algorithms are well-known but included for reference purposes. The multi-tone algorithms adapt the weights as a function of κ training tones (or a sub-band), where κ is a subset of the total number of training tones, v, and $\kappa \leq v$.

The least-mean square (LMS) algorithm is the most well known stochastic gradient algorithm. When its step-size coefficient is set appropriately, the algorithm is convergent in the mean $$E[\hat{w}(n)] \rightarrow w_o \text{ as } n \rightarrow \infty$$

in which $w_o$ is the Wiener solution. The LMS algorithm is also convergent in the mean square $$J(n) \to J(\infty) \text{ as } n \to \infty$$

The final value of mean-squared error, $J(\infty)$, is always greater than $J_{min}$, the minimum mean squared error of the Wiener solution, since the adaptation algorithm produces a certain amount of misadjustment, $\phi$, defined as the ratio of excess mean-squared error $J_{ex}(\infty)$ to the minimum mean-squared error $J_{min}$ $$\varphi = \frac{J_{ex}(\infty)}{J_{min}}$$

In both single-tone and multi-tone versions, the LMS algorithm is extremely simple and does not require any matrix inversions or division operations. The single-tone LMS algorithm (ST-LMS) iteratively calculates a different weight vector for each training tone. The LMS algorithm is initialized by setting the M×1 estimated weight vector for each training tone (i=1, 2 . . . . ν) to zero $$\hat{w}(0)=0$$

The estimated weight for the next time epoch, n+1, is based upon the error between the desired training tone value and estimated training tone value (based upon the current weight vector applied to the input data vector)

$$e_i(n) = d_i(n) - \hat{w}_i^H(n)u_i(n)$$

The estimated weight vector for the $i^{th}$ training tone is calculated as $$\hat{w}_i(n+1) = \hat{w}(n) + \mu u_i(n) e_i^*(n)$$

in which $\mu$ is the LMS step-size parameter.

The multi-tone LMS algorithm (MT-LMS) minimizes the mean-square error over κ received training tones with a single M×1 weight vector. The multi-tone algorithm is listed below $$\hat{w}(0)=0$$

$$e(n) = d(n) - \hat{w}^H(n)u(n)$$

$$\hat{w}(n+1) = \hat{w}(n) + \mu u(n) e^H(n)$$

The input signal, u(n) is a M×κ matrix where, as previously documented, κ≦ν. Since the error signal for the multi-tone algorithm is a 1×κ vector, the complex conjugation in the standard weight update equation is replaced with a Hermitian transpose.

The exponentially weighted recursive least squares algorithm minimizes the cost function below $$\sum_{i=1}^{n} \lambda^{n-i} |e(i)|^2$$

in which e(i) is the difference between a desired response d(i) and the output y(i) after applying a tap-weight vector $$e(i) = d(i) - \hat{w}^H(n)u(i)$$

Although the RLS algorithms are specifically described herein, this invention recognizes that additional algorithms based on Kalman filter theory could be employed to calculate spatial weights for non-stationary systems. The RLS algorithm may be derived from Kalman filter theory. It is noted that in contrast to the LMS algorithm, recursive least-squares minimizes the error over an exponentially weighted time interval, not in a statistical sense. The factor $1/(1-\lambda)$ may be interpreted as the memory of the algorithm.

For single-tone adaptation (ST-RLS), the standard RLS equations are implemented where $P_i(n)$ is the estimated inverse covariance matrix $R_i^{-1}(n)$ and k(n) is the gain vector. To initialize the algorithm, the diagonal of $P_i(0)$ (an M×M matrix) is initialized to a constant value equal to $\delta^{-1}$ and the estimated weight vector is set to zero. The quantity $\lambda$ is referred to as the forgetting factor and controls the memory of the algorithm and, likewise, its ability to track signals in a non-stationary environment $$P_i(0) = \delta^{-1} I$$

$$\hat{w}(0) = 0$$

The gain vector, $k_i(n)$, is explicitly computed for each iteration from the $P_i(n-1)$, $u_i(n)$ and $\lambda$. The quantity $\alpha_i(n)$ is the apriori estimation error and is often referred to as the innovation. It is a different quantity than $e_i(n)$, the posteriori estimation error that is actually minimized by the least-squares cost function for each individual training tone $$k_i(n) = \frac{\lambda^{-1} P_i(n-1) u_i(n)}{1 + \lambda^{-1} u_i^H(n) P_i(n-1) u_i(n)}$$

$$\alpha_i(n) = d_i(n) - \hat{w}_i^H(n-1) u_i(n)$$

For single-tone adaptation, $k_i(n)$ is a M×1 vector.

Recursive updates are only performed for the estimated weight vector and the estimated inverse covariance matrix, P(n)

$$\hat{w}_i(n) = \hat{w}(n-1) + k_i(n) \alpha_i^*(n)$$

$$P_i(n) = \lambda^{-1} P_i(n-1) - \lambda^{-1} k_i(n) u_i^H(n) P_i(n-1)$$

Since the standard RLS algorithm assumes an input signal vector, as provided in the single-tone case, the equations must be slightly modified to accommodate the M×κ matrix of input signals in the multi-tone case. The RLS algorithm will still minimize the least squares cost function, provided that the posteriori estimation error be expressed as the squared norm of a vector, not a scalar.

The multi-tone RLS algorithm (MT-RLS) is defined in the equations below $$P(0) = \delta^{-1} I$$

$$\hat{w}(0) = 0$$

$$k(n) = \frac{\lambda^{-1} P(n-1) u(n)}{1 + \lambda^{-1} tr[u^H(n) P(n-1) u(n)]}$$

$$\alpha(n) = d(n) - \hat{w}^H(n-1) u(n)$$

$$\hat{w}(n) = \hat{w}(n-1) + k(n) \alpha^H(n)$$

$$P(n) = \lambda^{-1} P(n-1) - \lambda^{-1} k(n) u^H(n) P(n-1)$$

The inverse covariance matrix has dimensions M×M, as in the single-tone case, but dimensions of the other quantities are quite different. The gain matrix is a M×κ matrix and the innovation vector, $\alpha(n)$, has dimensions 1×κ. The weight vector has, as in previous multi-tone algorithms, dimensions of M×1. The calculation of the gain uses the trace operator (sum of the diagonal elements) to obtain a scalar quantity in the denominator of the expression.

Sample matrix inversion with diagonal loading (SMI/DL) has been proposed for both TDMA and CDMA systems, primarily because of its relatively robust performance with limited training information. The optimum weight vector is defined by the standard solution to the Wiener-Hopf equations $$w_o = R^{-1}p$$

in which R is the covariance matrix of the input vector u(n), and p is the cross-correlation between u(n) and the desired response d(n). Since exact values of R and p are normally not known, the sample matrix inversion algorithm calculates estimates of them to solve for the array weight vector.

In the single-tone (ST-SMI) case, the estimated spatial covariance matrix for the $i^{th}$ training tone is defined by $$\hat{R}_i(n) = \left(\frac{1}{K(n)} \sum_{j=n-K(n)+1}^{n} u_i(j) u_i^H(j)\right) + \gamma \sigma^2 I$$

in which K(n) is the number of samples averaged in a sliding window. The factor γ controls the amount of diagonal loading added to the matrix ($\sigma^2$ is the receiver output noise variance). The estimated cross-correlation vector is calculated as $$\hat{p}_i(n) = \frac{1}{K(n)} \sum_{j=n-K(n)+1}^{n} u_i(j) d_i^*(j)$$

in which $d_i(j)$ is the desired response at t=jT.

Multiplying the inverse of the estimated covariance matrix by the estimated cross-correlation vector yields the array weight vector for the $i^{th}$ training tone $$\hat{w}(n) = \hat{R}_i^{-1}(n)\hat{p}_i(n)$$

A total of ν weight vectors are independently computed using these three equations.

The multi-tone implementation (MT-SMI) defines the estimated frequency-averaged spatial covariance matrix as $$\hat{R}(n) = \left(\frac{1}{K(n)} \sum_{j=n-K(n)+1}^{n} u(j) u^H(j)\right) + \gamma \sigma^2 I$$

in which the columns of u(j) are M×1 input signal vectors for different training tones. The averaging over frequency becomes apparent when one expands a sample covariance matrix $$u(j)u^H(j) = \begin{bmatrix} A & C & \cdots & \cdots \\ B & D & \cdots & \cdots \\ \vdots & \vdots & \ddots & \cdots \\ \vdots & \vdots & \vdots & \ddots \end{bmatrix}$$

$A = u_{1,1}(j)u_{1,1}^*(j) + u_{1,2}(j)u_{1,2}^*(j) + u_{1,3}(j)u_{1,3}^*(j) + \ldots + u_{1,\alpha}(j)u_{1,\alpha}^*(j)$ $B = u_{2,1}(j)u_{1,1}^*(j) + u_{2,2}(j)u_{1,2}^*(j) + u_{2,3}(j) u_{1,3}^*(j) + \ldots + u_{2,\alpha}(j)u_{1,\alpha}^*(j)$ $C = u_{1,1}(j)u_{2,1}^*(j) + u_{1,2}(j)u_{2,2}^*(j) + u_{1,3}(j) u_{2,3}^*(j) + \ldots + u_{1,\alpha}(j)u_{2,\alpha}^*(j)$ $D = u_{2,1}(j)u_{2,1}^*(j) + u_{2,2}(j)u_{2,2}^*(j) + u_{2,3}(j) u_{2,3}^*(j) + \ldots + u_{2,\alpha}(j)u_{2,\alpha}^*(j)$ It is noted, in all cases, that each matrix element includes contributions from every training tone (from 1 ... κ). The remaining equations minimize the mean square error over κ training tones $$\hat{p}(n) = \frac{1}{K(n)} \sum_{j=n-K(n)+1}^{n} u(j) d^H(j)$$

$$\hat{w}(n) = \hat{R}^{-1}(n)\hat{p}(n)$$

It is noted that in the calculation of the estimated cross-correlation matrix, the complex conjugation has been replaced by a Hermitian transpose since d(j) has dimensions 1×κ. Unlike the single-tone adaptation, these equations produce a single M×1 array weight vector for a group of κ tones.

The value K(n) is defined as the number of samples averaged to compute the estimated covariance and cross-correlation matrices. The number of frames averaged begins with one (as only one frame is available) and progresses in a linear fashion up to $K_{max}$. Once $K_{max}$ is reached, the samples are averaged in a sliding window K(n)=n  n=0 ... K K(n)=$K_{max}$  n>K The adaptation of K(n) is further illustrated in the diagram 400 of FIG. 4. The sliding window adaptation (K(n)=6) begins at nT=5T. This type of technique, as opposed to fixed sliding block averaging, produces more accurate results for nT<5T.

The two parameters of the ST-SMI and MT-SMI algorithms are the maximum block length, $K_{max}$, and the diagonal loading factor, γ. The maximum block length controls the amount of residual MSE, or misadjustment, of the algorithm in a steady-state condition. In some applications, the diagonal loading factor is necessary for the matrix to be invertible and may also be employed to adaptively control the antenna pattern.

Figure 4:
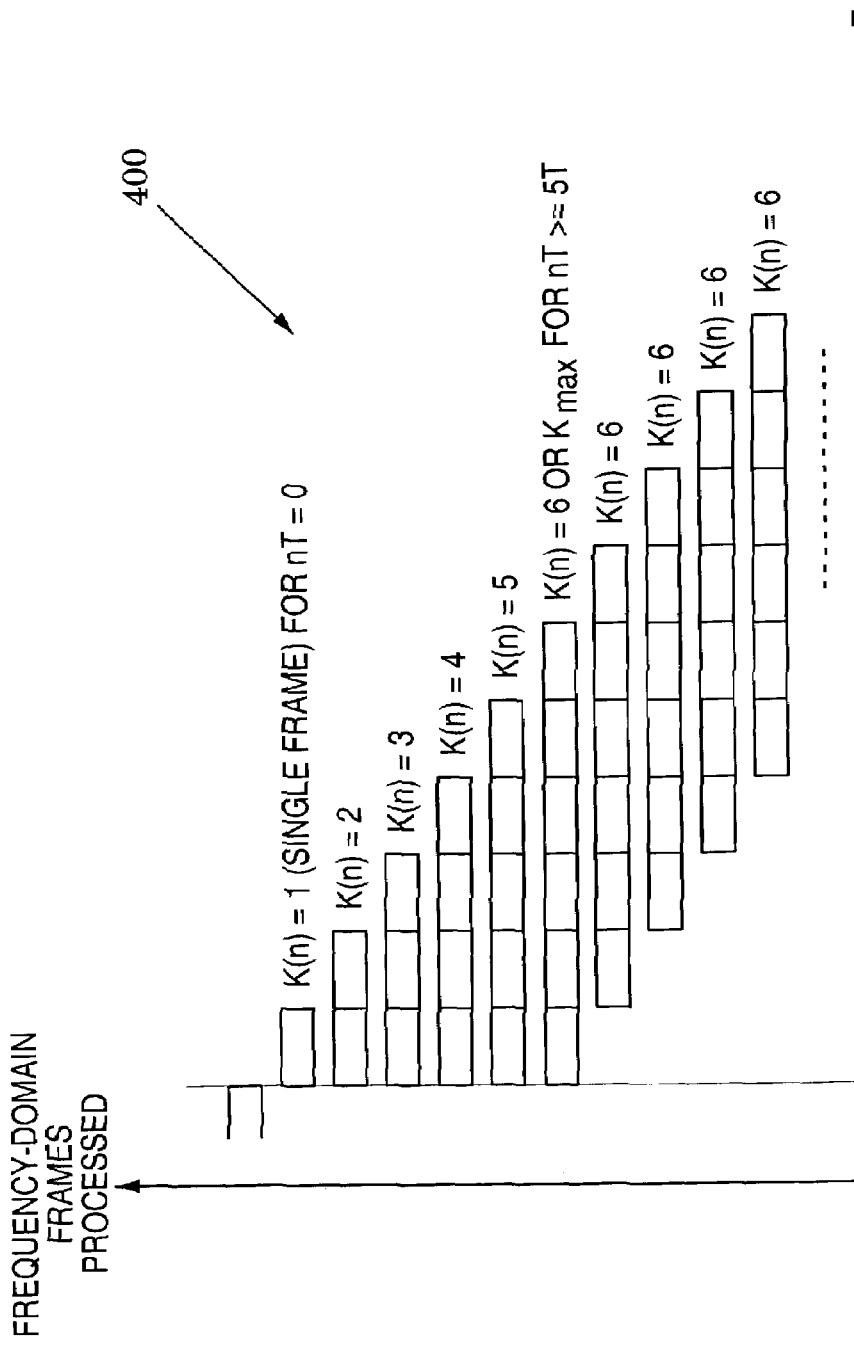
FIG. 4 is a diagram that illustrates a sliding-window averaging technique in a sample matrix inversion (SMI) algorithm of the diagram of FIG. 3.

In addition to sliding window averaging as described above, the invention includes additional embodiments that utilize different techniques to estimate the covariance and cross-correlation in the ST-SMI and MT-SMI algorithms. The first embodiment employs a nonlinear filter to derive the estimated covariance and cross-correlation. The most common type of nonlinear filter is the median filter, which is a more robust estimator than averaging in the presence of impulsive noise. Taking the median of the parenthesized multiplicative result over a sliding window (as illustrated in FIG. 4) results in the following expressions for the single-tone estimated covariance and cross-correlation $\hat{R}_i(n) = \text{med } (u^i(j)u^{iH}(j)) + \gamma \rho^2 I$ $\hat{p}_i(n) = \text{med } (u_i(j)d_i^*(j))$ Likewise, the multi-tone equations for estimated covariance and cross-correlation may be modified to employ a sliding window median function as illustrated below $$\hat{R}(n) = \text{med}\ (u(j)u^H(j)) + \gamma\sigma^2 I \quad\quad 5$$

$$\hat{p}(n) = \text{med}\ (u(j)d^H(j))$$

The second embodiment utilizes adaptive filtering techniques to estimate the covariance and cross-correlation. For example, such an embodiment could produce, effectively, a longer filter time constant in low signal-to-noise conditions to improve estimation accuracy.

Although the invention imposes no restrictions on the technique(s) employed to solve the linear equation for the array weight vector in the ST-SMI and MT-SMI algorithms, a preferred embodiment is the $LDL^H$ factorization combined with forward and backward substitution. In many references on matrix computations, this type of factorization is referred to as $LDL^T$ for real data. $LDL^T$ has been referred to as the Square Root Free Cholesky Factorization. The $LDL^H$ factorization decomposes a Hermitian square positive-definite matrix into L, a lower triangular with ones on the diagonal and D, a diagonal matrix, the original matrix being equivalent to $LDL^H$, where the 'H' superscript denotes a Hermitian transpose.

The advantage of $LDL^H$ definite factorization, relative to the standard Cholesky $GG^H$ triangular factorization, is that the former does not require any square root operations. Neither factorization technique ($LDL^H$ or $GG^H$) require pivoting (given that R is Hermitian and positive definite), and both are significantly faster than other methods for solving linear equations since they take full advantage of the covariance matrix structure.

In particular embodiments, more than one algorithm may be employed and used in concert with other algorithms. For instance, an SMI algorithm (ST-SMI or MT-SMI) could be utilized for fast acquisition of a preamble consisting completely of training tones, followed by the use of an RLS-variant (ST-RLS or MT-RLS) or LMS-variant (ST-LMS or MT-LMS) for tracking the system using training tones that are embedded with data tones. In an RLS tracking application, the estimated inverse covariance matrix(s) would be initialized by an SMI algorithm after initial adaptation on the preamble.

While particular embodiments of receive spatial algorithm 311 have been described, it should be clear that changes and modifications may be made to such embodiments without departing from the true spirit of the invention. Furthermore, when no embedded reference tones are available for tracking, the algorithms herein may employ decision-feedback techniques using the outputs of demodulate 243 as the reference, d(n).

Figure 5:
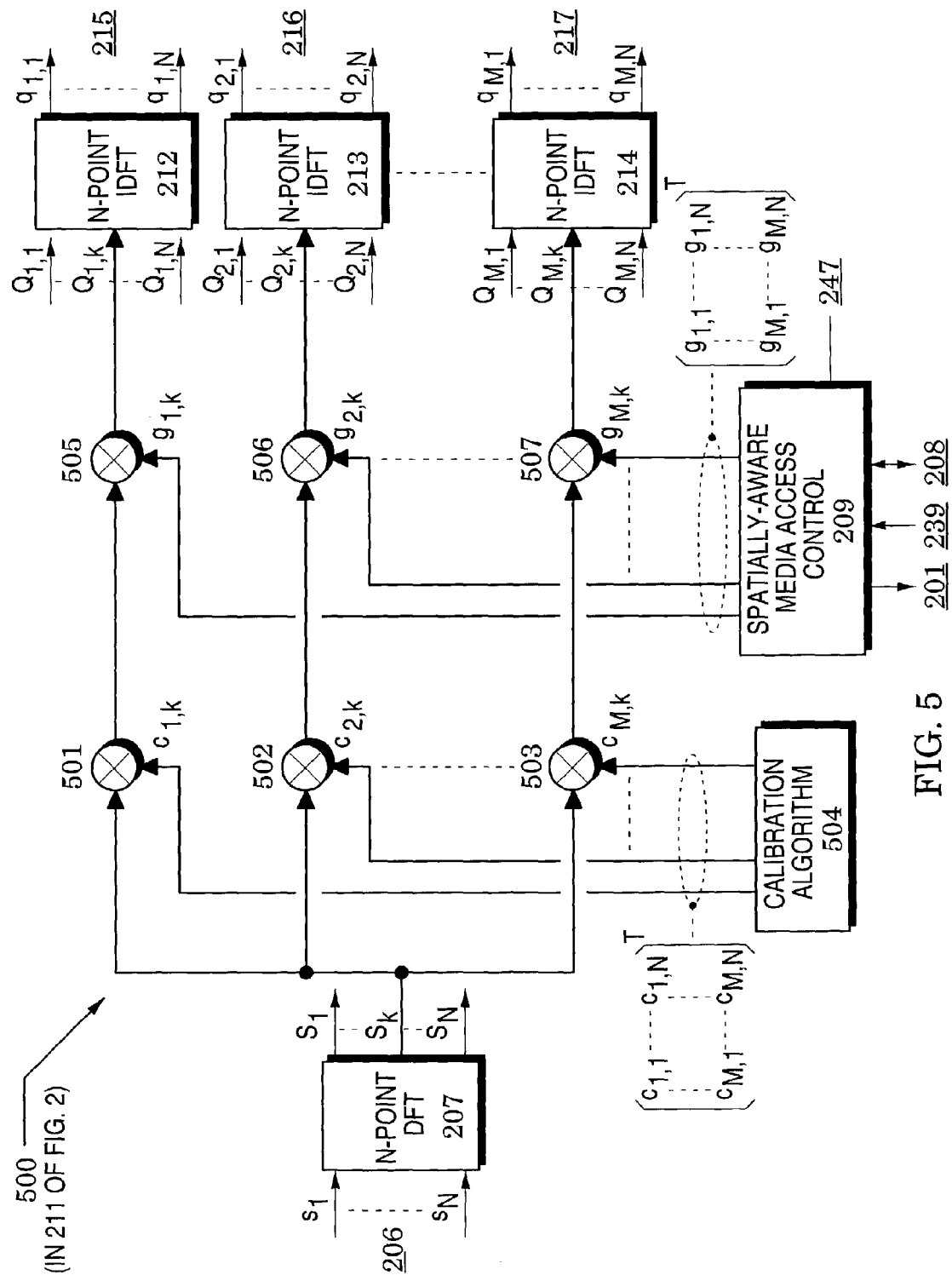
FIG. 5 is a diagram of transmit spatial processing in the base station of FIG. 2.
Figure 6:
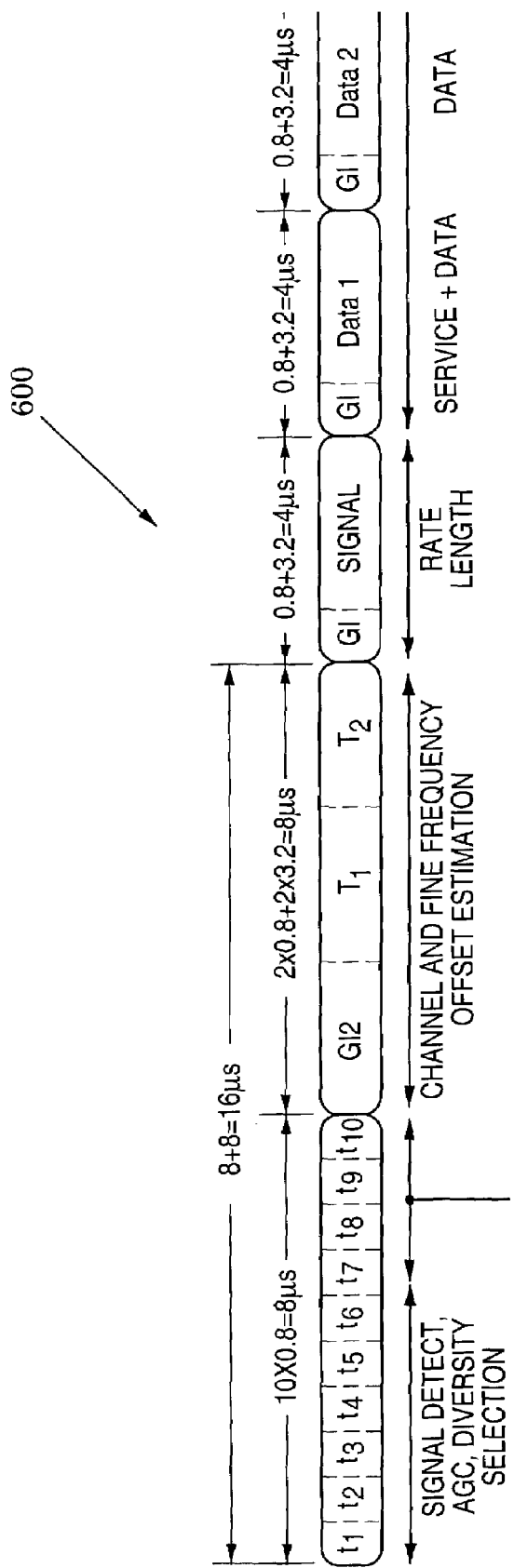
FIG. 6 is timing diagram of an orthogonal frequency division multiplex (OFDM) frame in the Institute of Electrical and Electronic Engineers (IEEE) Standard (Std) 802.11a-1999.

Transmit spatial processing 211 of FIG. 2 is shown in the greater detail 500 of FIG. 5. The time index for frequency domain signals, $nT_{DFT}$, is not shown for the sake of clarity. The frequency domain output, $S_1$ through $S_N$, is distributed to all spatial channels (1 through M) where a matrix, c(n) of complex calibration coefficients are applied to the frequency domain output of the DFT 207.

$$c(n) = \begin{bmatrix} c_{1,1}(n) & c_{1,2}(n) & \cdots & c_{1,N}(n) \\ c_{2,1}(n) & c_{2,2}(n) & \cdots & \cdots \\ \vdots & \vdots & \ddots & \cdots \\ c_{M,1}(n) & \vdots & \vdots & c_{M,N}(n) \end{bmatrix}^T$$

FIG. 5 illustrates the application of the $c_{1,k}$ through $c_{M,k}$ to the kth frequency domain output ($S_k$) using multipliers 501 through 503. The calibration coefficients compensate for the relative amplitude and phase errors between spatial channels due to receiver and transmitter implementation imperfections. This invention does not impose any restrictions on the algorithms or techniques employed to estimate the amplitude and phase of the receiver and transmitter spatial channels. To preserve digital signal processing resources, some embodiments may only directly measure/calculate a subset of NM possible complex coefficients, using interpolation or some other technique to indirectly obtain those that remain.

The spatially aware media access control 209 calculates a unique M×1 transmit weight vector for the kth frequency domain output. The transmit weight vector is applied to the output of calibration coefficient multipliers 501 through 503 as indexed by "k". The multipliers 505 through 507 illustrate the weight vector multiplication for the kth frequency domain output. As stated elsewhere, the order in which the calibration coefficients and transmit weights are applied may be juxtaposed. The output of multipliers 505 through 507 are provided to N-point IDFTs 212 through 214 that transform the processed signals into the time domain.

One embodiment of this invention is an IEEE Std 802.11a-1999 compliant Access Point. Referring now to the diagram 600 of FIG. 6, the OFDM signal defined in IEEE Std 802.11a-1999 consists of a 16 microsecond preamble followed by a SIGNAL frame (used for control purposes) and then data frames. The short training symbols, $t_1$ through $t_{10}$, are generated by 12 modulated subcarriers in the frequency domain. The scale factor is necessary to normalize the average power of the OFDM symbol.

$S_{-26,26}$ = sqrt(13/6)×{0, 0, 1+j, 0, 0, 0, −1−j, 0, 0, 0, 1+j, 0, 0, 0, −1−j, 0, 0, 0, −1−j, 0, 0, 0, 1+j, 0,0 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0}

When $S_{-26,26}$ (all other subcarriers are zero) is transformed into the time domain by a 64-point IDFT, the resulting time domain symbols, $t_1$ through $t_{10}$, are periodic in 16 samples.

A time-domain autocorrelation approach for frequency and timing synchronization has been widely accepted by industry. This algorithm performs an autocorrelation of the received complex signal r with a lag of L samples, where L is the periodicity of the OFDM signal and d is the time index of the first sample in a 2L sliding window $$P(d) = \sum_{m=0}^{L-1} (r^*_{d+m} r_{d+m+L})$$

To form the timing metric, M(d), the autocorrelation sum, P(d) is normalized by the received signal power, R(d)

$$R(d) = \sum_{m=0}^{L-1} |r_{d+m+L}|^2$$

$$M(d) = \frac{|P(d)|^2}{(R(d))^2}$$

Figure 7:
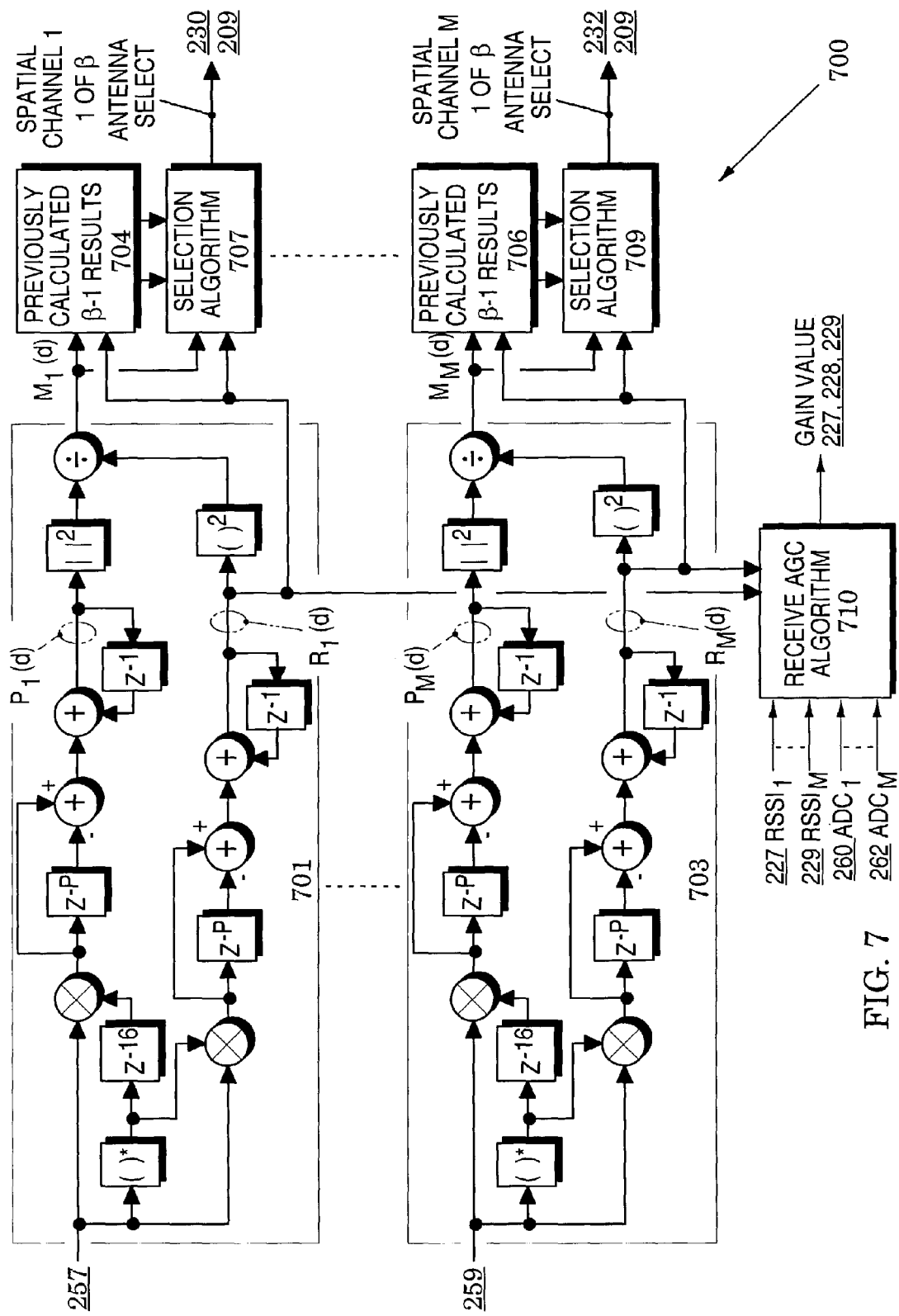
FIG. 7 is a diagram of an algorithm embodiment to select one of b antennas on each spatial channel of the base station of FIG. 2 for an IEEE Std 802.11a-1999 application.

Referring now to the diagram 700 of FIG. 7, an embodiment of the invention dictates that an autocorrelation and power estimate be performed on each spatial channel, and denote such as $P_j(d)$ and $R_j(d)$, respectively, j=1 through M. The summations are performed over P samples, where P may be equal to L or any multiple or fraction thereof. The following equations are embodied in functional blocks 701 through 703, operating on the output signal from DDCs 257 through 259.

$$P_j(d) = \sum_{m=0}^{P-1} (r^*_{j,d+m} r_{j,d+m+L})$$

$$R_j(d) = \sum_{m=0}^{P-1} |r_{j,d+m+L}|^2$$

Assuming that the RF switches (230 through 231 in FIG. 2) are set to a known state, the automatic gain control (AGC) algorithm embodied in 710 processes $R_j(d)$ and received signal strength (RSSI) outputs from RF transceivers (227 through 229 in FIG. 2) to set the gain in the aforementioned transceivers. The AGC algorithm may also utilize other system indications, such as outputs from ADCs (260 through 262 in FIG. 2) or autocorrelation results ($P_j(d)$), in calculating the gain value.

Once the receiver gain has been set, the Schmidl/Cox timing metric for each channel, $M_j(d)$, is calculated by dividing the magnitude squared of $P_j(d)$ by the square of $R_j(d)$ as shown in functional blocks 701 through 703.

$$M_j(d) = \frac{|P_j(d)|^2}{(R_j(d))^2}$$

The metrics $M_j(d)$ are not used for timing in this application, but are sampled and stored in 704 through 706 for later comparison with metrics from other switch positions (1 through β). The automatic gain control and metric computations are performed for the remaining β-1 switch positions, and a comparison is performed by 707 through 709 to determine the largest normalized autocorrelation result from β switch positions on each spatial channel. Functional block 707 through 709 generates signals to set switches 230 through 232 to the position that corresponds to the largest normalized autocorrelation result.

Blocks 707 through 709 may also employ algorithms that select the switch position based on power measurements alone ($R_j(d)$) from β switch positions on each spatial channel, or some other type of measurement, such as correlation with a known reference signal comprised of one or more short symbols, $t_1$ through $t_{10}$. The antenna selection for each spatial channel is stored in the spatially aware media access control 209 so that the switch can be, along with spatial weights, applied during the transmit mode if appropriate.

There are many alternative mechanisms for examining the degree of autocorrelation. The expression for $M_j(d)$ may be compared to a threshold value to generate a boolean decision variable, $$\frac{|P_j(d)|^2}{(R_j(d))^2} > \text{Threshold}$$

The division included in the calculation of $M_j(d)$ can be very processing intensive. However, in situations where only a decision value is required, the prior equation may be rearranged so that only a multiplication is required, $|P_j(d)|^2 > (\text{Threshold})(R_j(d))^2$ Likewise, one potential embodiment of the switch selection algorithm is to first check which switch positions satisfy the comparison criteria above (requiring only a multiplication), and from this subset, select the position that generated the largest power, $R_j(d)$.

Once the selection of the appropriate switch state is complete, the remaining short symbols are processed to estimate coarse timing and coarse frequency offset. This invention defines the multichannel autocorrelation, $P_{MC}(d)$, and timing metric, $M_{MC}(d)$, as follows $$P_{MC}(d) = \sum_{j=1}^{M} P_j(d)$$

$$M_{MC}(d) = \frac{|P_{MC}(d)|^2}{\left(\sum_{j=1}^{M} R_j(d)\right)^2}$$

The maximum value of $M_{MC}(d)$ is used to determine the start of the OFDM frame, while the frequency offset can be estimated by taking the angle of $P_{MC}(d)$. The multichannel quantities are, in effect, manipulated in the same way as P(d) and M(d) to determine timing and frequency offset in an M=1 system.

For pre-DFT fine frequency and timing synchronization, the two long symbols ($T_1$ and $T_2$ in FIG. 6) may be processed using the same basic multichannel algorithm, except that L=64 and P=L (since only two symbols are available). An alternative technique for fine timing synchronization is to correlate the received long sequence with a known reference signal comprised of samples from the long symbols; in this case, the correlator outputs from each spatial channel would be summed to provide the final decision metric.

One embodiment of the invention as applied to 802.11a employs multi-tone SMI (MT-SMI) to calculate the optimum weights for a subset of IEEE 802.11 tones based, initially, on known training tones in the long symbols $T_1$ and $T_2$. In this embodiment, N=64. Each of these symbols consists of 53 known subcarriers (L)

$L_{-26,26} = \{1, 1, -1, -1, 1, 1, -1, 1, -1, 1, 1, 1, 1, 1, 1, -1, -1,$
$1, 1, -1, 1, -1, 1, 1, 1, 1, 0, 1, -1, -1, 1, 1, -1, 1, 1, 1, 1,$
$-1, -1, -1, -1, -1, 1, -1, -1, 1, -1, 1, -1, 1, 1, 1, 1\}$

As defined above, $L_0$ is the dc bin of the DFT. The diagram 800 of FIG. 8 illustrates the frequency-domain locations occupied by no energy, training, and data subcarriers.

After initial weight calculation with the multi-tone SMI algorithm, the weights may be updated from algorithms that processing the embedded pilot tones or utilize decisions from the output of demodulate 243 (decision-feedback). The pilot tones are identified by indexes −21, −7, 7, and 21 in FIG. 8.

Figure 8:
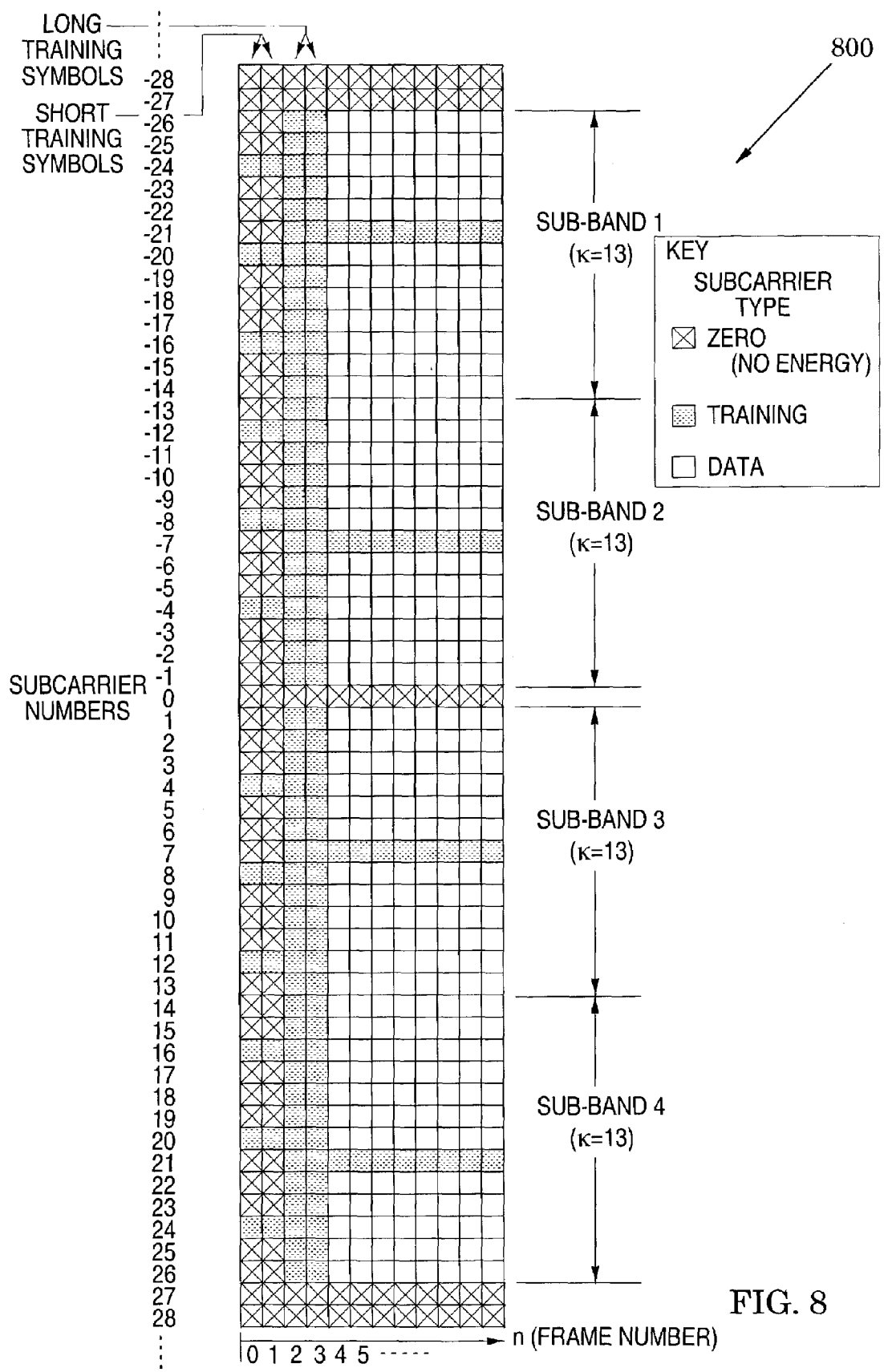
FIG. 8 is a graph that illustrates a frequency domain structure and one embodiment of subband weight assignment for an IEEE Std 802.11a-1999 application.

To allow for subsequent adaptation with the pilot tones, the initial four M×1 weights are calculated as follows with "sb" designating a subset or "subband" of as illustrated in FIG. 8

$W_{st1}$ calculated from $L_{-26}$ to $L_{-14}$ (κ=13) in long symbols $T_1$ and $T_2$ (n=2,3), $W_{st2}$ calculated from $L_{-13}$ to $L_{-1}$ (κ=13) in long symbols $T_1$ and $T_2$ (n=2,3), $W_{st3}$ calculated from $L_1$ to $L_{13}$ (κ=13) in long symbols $T_1$ and $T_2$ (n=2,3), and $W_{st4}$ calculated from $L_{14}$ to $L_{26}$ (κ=13) in long symbols $T_1$ and $T_2$ (n=2,3).

If the pilot tracking mode is enabled, the four weights are adapted using the ST-SMI, ST-RLS, or another suitable algorithm as follows for n≧4

$W_{sb1}$ adapted from $L_{-21}$ $W_{sb2}$ adapted from $L_{-7}$, $W_{sb3}$ adapted from $L_7$, and $W_{sb4}$ adapted from $L_2$ If multi-tone, decision-directed tracking mode is enabled, the four weights are adapted using the MT-SMI, MT-RLS, or another suitable algorithm as follows for n≧4

$W_{sb1}$ adapted from $L_{-26}$ to $L_{-14}$ (κ=13) demodulate 243 outputs, $W_{sb2}$ adapted from $L_{-13}$ to $L_{-1}$ (κ=13) demodulate 243 outputs, $W_{sb3}$ adapted from $L_1$ to $L_{13}$ (κ=13) demodulate 243 outputs, and $W_{sb4}$ adapted from $L_{14}$ to $L_{26}$ (κ=13) demodulate 243 outputs If single-tone, decision-directed tracking mode is enabled, the sub-band weights provide the initial "per-tone" weights for ST-SMI, ST-RLS, or another suitable algorithm as calculated for each individual tone from the output of demodulate 243.

The SMI algorithms average the array covariance matrix and cross-correlation vectors obtained from the two long training symbols prior to solving for the weight vector. This corresponds to a K(n)=$K_{max}$=2. An 802.11a embodiment may also have the capability to calculate the weights based on the first long training symbol exclusively. In tracking mode, the sliding window average may be programmable.

Although it is noted that the RF transceivers 227 through 229, the RF switches 230 through 232, the antennas 233 through 238, the DAC's 224 through 226 and the ADC's 260 through 262 would generally be realized with conventional discrete elements, the remaining structure shown in FIGS. 2, 3, 5 and 7 may be integrated into one or more processors that are realized with discrete components (e.g., suitably-arranged logic devices) or with suitably-programmed computer elements.

Although embodiments of the present invention have been described with reference to a base station and associated uplink and downlink signals, the features and advantages of the invention are more generally directed to communication methods and devices that process receive and transmit communication signals.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of receiving receive signals from at least one remote station and transmitting transmit signals to said remote station, comprising the steps of:
    downconverting a plurality of receive wireless signals to receive digitized baseband signals;
    transforming each of said receive digitized baseband signals to parallel receive frequency-domain signals;
    spatially processing said receive frequency-domain signals to generate receive weighted frequency-domain signals;
    demodulating said receive weighted frequency-domain signals to recover said receive signals;
    modulating said transmit signals into transmit modulated baseband signals; transforming each of said transmit modulated baseband signals to a plurality of transmit frequency-domain signals;
    spatially processing said transmit frequency-domain signals to generate a plurality of transmit weighted frequency-domain signals;
    converting said transmit weighted frequency-domain signals to transmit weighted analog signals; and
    upconverting said transmit weighted analog signals to transmit wireless signals.

2. The method of claim 1, wherein said downconverting step includes the step of digitizing to obtain said receive digitized baseband signals.

3. The method of claim 1, wherein said downconverting step includes the steps of:
    passing said receive wireless signals through receivers that are each coupled to at least one respective antenna; and
    converting signals from each of said receivers through respective analog-to-digital converters and digital downconverters to obtain said receive digitized baseband signals.

4. The method of claim 3, wherein said downconverting step further includes the step of configuring said digital downconverters to receive a selected one of intermediate-frequency signals and baseband signals from said analog-to-digital converters.

5. The method of claim 3, further including the step of removing cyclic extensions from each of said receive digitized baseband signals.

6. The method of claim 1, wherein said transforming step corresponding to said receive frequency-domain signals includes the steps of:
    converting each of said receive digitized baseband signals to a plurality of parallel signals; and
    discrete Fourier transforming said parallel signals into said receive frequency-domain signals.

7. The method of claim 1, wherein said spatially processing step corresponding to said receive frequency-domain signals includes the step of multiplying each of said receive frequency-domain signals with respective receive spatial weights to realize said weighted frequency-domain receive signal.

8. The method of claim 7, further including the steps of:
    from each of said receive frequency-domain signals, extracting a set of training tones; and
    deriving said receive spatial weights to reduce an error between a desired signal and a product of said training tones and said receive spatial weights.

9. The method of claim 8, wherein said deriving step includes the step of calculating said receive spatial weights from a plurality of training tones.

10. The method of claim 8, wherein said deriving step includes the step of utilizing a multi-tone sample matrix inversion algorithm to calculate multiple receive spatial weights based on a plurality of correlation vectors that each correspond to a time reference.

11. The method of claim 8, further including the step of deriving said desired signal from demodulated symbols.

12. The method of claim 8, wherein said deriving step includes the step of iteratively reducing the error between said desired signal and the product of said training tones and estimates of said receive spatial weights.

13. The method of claim 8, wherein said deriving step includes the step of recursively reducing the product of a forgetting factor and the square of an error between said desired signal and the product of said training tones and estimates of said receive spatial weights.

14. The method of claim 8, wherein said deriving step includes the steps of:
estimating a spatial covariance matrix of said training tones;
estimating a cross-correlation between said training tones and said desired signal; and
multiplying said cross-correlation and the inverse of said covariance matrix to obtain said receive spatial weights.

15. The method of claim 14, wherein said deriving step includes the steps of:
estimating a spatial covariance matrix of said training tones; and
obtaining said through $LDL^H$ factorization of said covariance matrix combined with forward and backward substitution.

16. The method of claim 14, further including the step of averaging estimates of said spatial covariance matrix and said cross-correlation over increasing numbers of samples of said training tones.

17. The method of claim 14, wherein said estimating steps each include the step of forming estimates with a nonlinear median filter.

18. The method of claim 14, wherein said estimating steps each include the step of forming estimates with an adaptive filter.

19. The method of claim 14, wherein said estimating steps each include the step of determining spatial covariance estimates and cross-correlation estimates from preamble information in said receive wireless signals.

20. The method of claim 1, wherein said spatially processing step corresponding to said receive frequency-domain signals further includes the step of frequency offsetting said receive frequency-domain signals to compensate for frequency errors.

21. The method of claim 1, wherein said spatially processing step corresponding to said receive frequency-domain signals further includes the step of correcting phase and amplitude errors in said receive weighted frequency-domain signals after weighting and combining of spatial channels.

22. The method of claim 1, wherein said demodulating and modulating steps are implemented in accordance with orthogonal frequency division multiplexing.

23. The method of claim 1, wherein said transforming step corresponding to said transmit frequency-domain signals includes the steps of:
converting each of said transmit modulated baseband signals to a plurality of parallel signals; and
discrete Fourier transforming said parallel signals into said transmit frequency-domain signals.

24. The method of claim 1, wherein said spatially processing step corresponding to said transmit frequency-domain signals includes the step of multiplying said transmit frequency-domain signals with transmit spatial weights to realize said weighted frequency-domain transmit signals.

25. The method of claim 24, further including the steps of:
decoding a source address from said receive frequency-domain signals;
storing said source address and said receive spatial weights as a stored source address and stored receive spatial weights; and
associating a time stamp with said stored receive spatial weights;
and wherein said spatially processing step corresponding to said transmit frequency-domain signals further includes the steps of:
verifying validity of said time stamp; and
using complex conjugates of said stored receive spatial weights for said transmit spatial weights.

26. The method of claim 24, further including the step of calculating said transmit spatial weights from elements which include said stored receive spatial weights.

27. The method of claim 24, further including the step of measuring differential amplitude and phase errors associated with said downconverting and upconverting steps to obtain corresponding calibration coefficients and wherein said spatially processing step corresponding to said transmit frequency-domain signals further includes the step of multiplying said transmit frequency-domain signals with said calibration coefficients.

28. The method of claim 1, wherein said converting step includes the steps of:
inverse discrete Fourier transforming said transmit frequency-domain signals into transmit time-domain signals;
converting said transmit time-domain signals to serial signals;
adding cyclic extensions to each of said serial signals; and
converting said serial signals to analog signals.

29. The method of claim 28, further including the step of delaying said transmit time-domain signals.

30. The method of claim 1, wherein said converting step includes the step of applying a frequency offset to said transmit weighted analog signals.

31. The method of claim 1, wherein said upconverting step includes the steps of:
passing each of said transmit weighted analog signals through a respective transmitter; and
coupling each transmitter to at least one respective antenna to generate said transmit wireless signals.

32. The method of claim 1, wherein:
said downconverting step includes the step of passing said receive wireless signals through M receivers that are each coupled to selected ones of $\beta$ respective antennas; and
said upconverting step includes the step of passing said transmit wireless signals through M transmitters that are each coupled to selected ones of said $\beta$ respective antennas;
and further including the steps of:
choosing said selected antennas with a criteria related to signal quality; from said receive digitized baseband signals, obtaining power estimates; and based on said power estimates, setting gains of said receivers.

33. The method of claim 32, further including the steps of:
from said receive digitized baseband signals, correlating said received signals with a known reference signal to generate correlation outputs that are associated with each of said antennas; and
in said downconverting and upconverting steps, selecting the one of said antennas that is associated with the greatest correlation output.

34. The method of claim 32, further including the steps of:
from said receive digitized baseband signals, obtaining normalized autocorrelation sums that are normalized by corresponding power estimates;
determining a greatest normalized autocorrelation sum; and
in said downconverting and upconverting steps, selecting the one of said β respective antennas that is associated with said greatest normalized autocorrelation sum.

35. The method of claim 32, further including the steps of:
from said receive digitized baseband signals, obtaining normalized autocorrelation sums that are normalized by corresponding power estimates;
determining a subset of said normalized autocorrelation sums that exceed a predetermined threshold;
from said subset, finding a selected antenna associated with the greatest power estimate; and
conducting said downconverting and upconverting steps with said selected antenna.

36. The method of claim 1, wherein:
said downconverting step includes the step of passing said receive wireless signals through M receivers that are each coupled to a selected antenna of β respective antennas;
said upconverting step includes the step of passing said transmit wireless signals through M transmitters that are each coupled to the selected antenna of a corresponding one of said receivers;
and further including the steps of:
udetermining autocorrelation sums and power estimates;
from said autocorrelation sums, finding a multichannel autocorrelation;
from said multichannel autocorrelation and said power estimates, finding a timing metric;
from said timing metric, determining starts of orthogonal frequency division multiplexing frames; and
from an angle of said multichannel autocorrelation, determining frequency offset.

37. The method of claim 1, wherein:
said downconverting step includes the step of passing said receive wireless signals through M receivers that are each coupled to a selected antenna of β respective antennas;
said upconverting step includes the step of passing said transmit wireless signals through M transmitters that are each coupled to the selected antenna of a corresponding one of said receivers;
and further including the steps of:
correlating sequences in received orthogonal frequency division multiplexing frames with a known reference signal to generate correlation outputs corresponding to said M receivers;
summing said correlator outputs to provide a decision metric; and
from said decision metric, determining starts of orthogonal frequency division multiplexing frames.

38. A method of applying transmit spatial weights to transmit signals transmitted to at least one remote station, comprising the steps of:
decoding message types of transmit messages; and
determining said transmit spatial weights in accordance with said message types;
wherein said message types are unicast messages and further including the steps of:
decoding respective destination addresses of said unicast messages;
retrieving stored receive spatial weights that correlate with said destination addresses;
retrieving stored receive antenna selections that correspond to said stored receive spatial weights; and
verifying validity of time stamps corresponding to said stored receive spatial weights;
and wherein said determining step includes the step of using said stored receive antenna selections for transmit antenna selections;
and wherein said determining step includes the step of using complex conjugates of said stored receive spatial weights for said transmit spatial weights.

39. The method of claim 38, further including the step of receiving said transmit messages from upper protocol layers.

40. A method of applying transmit spatial weights to transmit signals transmitted to at least one remote station, comprising the steps of:
decoding message types of transmit messages; and
determining said transmit spatial weights in accordance with said message types;
wherein said message types are unicast messages and further including the steps of:
decoding respective destination addresses of said unicast messages; and
sensing at least one of an absence of stored receive spatial weights and invalidity of time stamps corresponding to said stored receive spatial weights;
and wherein said determining step includes the step of using stored omni-directional spatial weights for said transmit spatial weights.

41. A method of applying transmit spatial weights to transmit signals transmitted to at least one remote station, comprising the steps of:
decoding message types of transmit messages; and
determining said transmit spatial weights in accordance with said message types;
wherein said message types are multicast messages and further including the steps of:
decoding respective destination addresses of said multicast messages;
retrieving stored receive spatial weights that correlate with said destination addresses;
retrieving stored receive antenna selections that correspond to said stored receive spatial weights; and
verifying validity of time stamps corresponding to said stored receive spatial weights;
and wherein said determining step includes the step of using said stored receive antenna selections for transmit antenna selections;
and wherein said determining step includes the step of using an appropriate mathematical combination of said stored receive spatial weights for said transmit spatial weights.

42. A method of applying transmit spatial weights to transmit signals transmitted to at least one remote station, comprising the steps of:
decoding message types of transmit messages; and
determining said transmit spatial weights in accordance with said message types;

wherein said message types are multicast messages and further including the steps of:

decoding respective destination addresses of said multicast messages; and sensing at least one of an absence of stored receive spatial weights, invalidity of time stamps corresponding to said stored receive spatial weights, and absence of appropriate mathematical combinations of said stored receive spatial weights;

and wherein said determining step includes the step of using stored omni-directional spatial weights for said transmit spatial weights.

43. A wireless communication device for receiving receive signals from at least one remote station and transmitting transmit signals to said remote station, comprising:

a plurality of transceivers;

analog-to-digital converters that are each coupled to a respective one of said transceivers;

digital-to-analog converters that are each coupled to a respective one of said transceivers;

a plurality of antennas;

a plurality of switches that each couples a respective one of said transceivers to at least a respective one of said antennas to thereby downconvert receive wireless signals to receive digitized baseband signals from said analog-to-digital converters; and a processor that is configured to:
  a) transform each of said receive digitized baseband signals to parallel receive frequency-domain signals;
  b) spatially process said receive frequency-domain signals to generate receive weighted frequency-domain signals; and
  c) demodulate said receive weighted frequency-domain signals to recover said receive signals;

and further configured to:
  d) modulate said transmit signals into transmit modulated baseband signals;
  e) transform each of said transmit modulated baseband signals to a plurality of transmit frequency-domain signals; and
  f) spatially process said transmit frequency-domain signals to generate transmit weighted frequency-domain signals;

wherein said digital-to-analog converters convert said transmit weighted frequency-domain signals to transmit weighted analog signals; and said transceivers, switches and antennas upconvert said transmit weighted analog signals to transmit wireless signals.

44. The wireless communication device of claim 43, wherein said processor is further configured to:

convert each of said receive digitized baseband signals to a plurality of parallel signals; and discrete Fourier transform said parallel signals into said receive frequency-domain signals.

45. The wireless communication device of claim 44, wherein said processor is further configured to multiply each of said receive frequency-domain signals with respective receive spatial weights to realize said weighted frequency-domain receive signals.

46. The wireless communication device of claim 45, wherein said processor is further configured to:

extract from each of said receive frequency-domain signals, a set of training tones; and derive said receive spatial weights to reduce an error between a desired signal and a product of said training tones and said receive spatial weights.

47. The wireless communication device of claim 45, wherein said processor is further configured to iteratively reduce the error between said desired signal and the product of said training tones and estimates of said receive spatial weights.

48. The wireless communication device of claim 45, wherein said processor is further configured to recursively reduce the product of a forgetting factor and the square of an error between said desired signal and the product of said training tones and estimates of said receive spatial weights.

49. The wireless communication device of claim 45, wherein said processor is further configured to:

estimate a spatial covariance of said training tones;

estimate a cross-correlation between said training tones and said desired signal; and multiply said cross-correlation and the inverse of said covariance matrix to obtain said receive spatial weights.

50. The wireless communication device of claim 43, wherein said processor is further configured to:

decode message types of transmit messages;

select respective antennas for said transmit signals in accordance with said message types; and determine said transmit spatial weights in accordance with said message types.

51. The wireless communication device of claim 43, wherein said processor is further configured to multiply said transmit frequency-domain signals with transmit spatial weights to realize said weighted frequency-domain transmit signals.

52. The wireless communication device of claim 51, said processor is further configured to:

decode a source address from said receive frequency-domain signals;

store said source address and said receive spatial weights as a stored source address and stored receive spatial weights; and associate a time stamp with said stored receive spatial weights; and is further configured to:

verify validity of said time stamp; and substitute complex conjugates of said stored receive spatial weights for said transmit spatial weights.

* * * * *

UNITED STATES PATENT AND TRADEMARK OFFICE
CERTIFICATE OF CORRECTION

PATENT NO.       : 7,072,693 B2
APPLICATION NO.  : 10/422411
DATED            : July 4, 2006
INVENTOR(S)      : Charles S. Farlow and Kris Kelkar It is certified that error appears in the above-identified patent and that said Letters Patent is hereby corrected as shown below:

In the Specifications:

In column 8, lines 3-7, the matrix contains a diagonal ellipsis that is in the wrong direction. Please replace the incorrect matrix with the correct matrix as follows:

$$\mathbf{u}(n) = \begin{bmatrix} u_{1,1}(n) & u_{1,2}(n) & \cdots & u_{1,v}(n) \\ u_{2,1}(n) & u_{2,2}(n) & \cdots & \vdots \\ \vdots & \vdots & \ddots & \vdots \\ u_{M,1}(n) & u_{M,2}(n) & \cdots & u_{M,v}(n) \end{bmatrix}$$

In column 11, lines 59-63, the matrix contains diagonal ellipses that are in the wrong direction. Please replace the incorrect matrix with the correct matrix as follows:

$$\mathbf{u}(j)\mathbf{u}^H(j) = \begin{bmatrix} A & C & \cdots & \cdots \\ B & D & \cdots & \cdots \\ \vdots & \vdots & \ddots & \cdots \\ \vdots & \vdots & \vdots & \ddots \end{bmatrix}$$

UNITED STATES PATENT AND TRADEMARK OFFICE
CERTIFICATE OF CORRECTION

PATENT NO. : 7,072,693 B2
APPLICATION NO. : 10/422411
DATED : July 4, 2006
INVENTOR(S) : Charles S. Farlow and Kris Kelkar It is certified that error appears in the above-identified patent and that said Letters Patent is hereby corrected as shown below:

In column 14, lines 3-7, the matrix contains a diagonal ellipsis that is in the wrong direction. Please replace the incorrect matrix with the correct matrix as follows:

$$\mathbf{c}(n) = \begin{bmatrix} c_{1,1}(n) & c_{1,2}(n) & \cdots & c_{1,N}(n) \\ c_{2,1}(n) & c_{2,2}(n) & \cdots & \cdots \\ \vdots & \vdots & \ddots & \cdots \\ c_{M,1}(n) & \vdots & \vdots & c_{M,N}(n) \end{bmatrix}^T$$

In column 16, line 58-60 should read $L_{-26,26}$ = {1, 1, -1, -1, 1, 1, -1, 1, -1, 1, 1, 1, 1, 1, 1, -1, -1, 1, 1, -1, 1, -1, 1, 1, 1, 1, 0,1, -1, -1, 1, 1, -1, 1, -1, 1, -1, -1, -1, -1, -1, 1, 1, -1, -1, 1, -1, 1, -1, 1, 1, 1, 1}

In the Claims:

In column 21, line 38, replace "udetermining" with --determining--.

Signed and Sealed this

Seventeenth Day of October, 2006

JON W. DUDAS
*Director of the United States Patent and Trademark Office*